Dec. 31, 1968    C. D. RUSSELL    3,418,825
CDR COMBINATION HIGH AND LOW PRESSURE POWER INJECTION HEATING
AND REFRIGERATION MACHINE AND METHOD
Filed March 7, 1967

INVENTOR
CARL D. RUSSELL

BY *Fisher, Christen, Sabol & Caldwell*
ATTORNEYS

United States Patent Office 3,418,825
Patented Dec. 31, 1968

3,418,825
CDR COMBINATION HIGH AND LOW PRESSURE
POWER INJECTION HEATING AND REFRIGER-
ATION MACHINE AND METHOD
Carl D. Russell, 1209 Walnut St.,
Muskogee, Okla. 74401
Filed Mar. 7, 1967, Ser. No. 621,339
15 Claims. (Cl. 62—483)

ABSTRACT OF THE DISCLOSURE

An absorption type refrigeration system having a boiler containing refrigerant and absorbent fluid wherein the refrigerant fluid passes through a condenser to an evaporator which includes a passageway to an absorber and wherein the absorbent fluid passes through a cooler to the absorber, the combination comprising: motor injection means in the refrigerant path before the condenser powered by the hot refrigerant vapors to power all fluids in the system; a jet passageway for the absorbent fluid from the cooler to the absorber; a venturi in communication between the jet passageway and the absorber; a further condenser; and a further passage from the absorber to the boiler including the further condenser whereby high pressure absorbent fluid is sprayed via the jet into the absorber for mixing with refrigerant fluid from the evaporator and the mixture returnd to the boiler for reheating.

---

The invention comprises a combination of high and low pressure refrigeration and heating system employing a jet and venturi principle with absorber for remixing fluids which are powered through the entire system by a motor injector, in turn drivn by high pressure refrigerant vapors. The invention offers the advantages of a small, compact self-contained unit because it may use water, e.g., as the refrigerant and employs an effective absorbent mixing arrangement through the use of a jet and venturi to spray the absorber fluid, such as bromide salts, thereby aiding inducement of the water vapors for efficient mixing and return to the boiler. During the heating operation, all absorber features are inoperative.

The motor injector is of a type described in my earlier patent application Ser. No. 402,356, filed Oct. 7, 1966, and entitled, "Mechanical Injection and Heat Operated Refrigeration Apparatus," now Patent No. 3,330,126, issued July 11, 1967; and my Patent No. 3,236,441 issued Feb. 22, 1966, and entitled "Reversing Valve." It employs a pair of interconnected pistons, each of which may pump fluids and is under the control of a reversing valve in turn operated in accordance with the pressure actuated diaphragm in the control section of the boiler.

Basically, the invention, for refrigeration operation, includes separate paths for the refrigerant and absorbent fluids until they are combined and returned to the boiler. The high pressure refrigerant fluid, in the form of vapor, after it has powered the motor injector, is delivered by the latter to a condenser where heat is removed permitting it to liquefy and thence by way of a capillary-type tube to an evaporator.

On the other hand, the absorbent fluid is moved by the motor injector through a cooler to a heat exchanger, in heat exchange relation with the evaporator, from which it is delivered to a jet to be jetted through the venturi arrangement into the absorber, thereby aiding and inducing the refrigerant fluid vapors into mixture. The mixture is then returned, through a second condenser, second heat exchanger in heat transfer relation with the evaporator, then under power of the motor injector, through a heat exchanger in heat transfer relation with the absorber, to the boiler for reheating.

A feature of the invention resides in incorporation of a unique predetermined pressure valve, jet, venturi and absorber arrangement which performs a very efficient mixing function. The high pressure absorbent liquid first opens the predetermined pressure valve and passes through the jet and at least a central portion of the stream passes entirely through the absorber to strike a deflector or the opposite or top wall thereof. This further converts the liquid into spray or vapor and a portion of this spray settles back into a trap in communication with the venturi.

As these absorbent fluids build up, a condition of fog or almost fog is approached which maximizes the mixing of the refrigerant vapors with the absorbent fluids for a highly efficient operation. The venturi permits any absorbent fluid which settle back, to be returned into the absorber for further mixing.

The absorber is provided with a series of spaced apart baffles or annular ring collectors for droplets which are collected at the bottom of the absorber and fed to the venturi for respray into the absorber. These rings are characterized by increasingly larger central openings in the direction away from the jet because the stream is somewhat conical in shape.

A further feature of the invention resides in the elimination of crystallization, a condition which plagues present day bromide salt and the like type systems. This is occasioned because the motor injector applies high pressure to the absorbent fluid and whenever the system is shut down, the pressure is maintained between the motor injector and the predetermined pressure valve, thereby precluding crystallization out of the salts.

The heating arrangement is incorporated into the refrigeration system and takes over when valves are switched to render the absorbent features inoperative and to utilize the refrigerant fluids for the heating function. The refrigerant vapors in the boiler still power the motor injector but by-pass the condenser and are sent directly to the evaporator. The condensed refrigerant vapors are returned from the evaporator by the motor injector to the boiler for reheating. Thus, it may be appreciated that either operation may be called for by the manipulation of a switch or the like and the boiler, motor injector, and evaporator are common to both systems.

With the foregoing in mind, certain objects and advantages of the invention will next be presented.

It is among the objects of the present invention to provide a compact, inexpensive, combination high and low pressure refrigeration system which is highly efficient in its operation.

Another object is the provision of such a system wherein maximum mixing is attained between the absorbent fluid and the refrigerant vapors for refrigeration.

A still further object of the invention is the provision of a system wherein the hot refrigerant high pressure vapors power the motor injector which drives all fluids in the system.

Another object of the invention is to provide a system capable of utilizing bromide salts and the like which retards crystallization even when the system is shut down for long periods of time.

A further object is the provision of such a device incorporating the motor injector in the boiler liquid to minimize condensation and crystallization.

Another object of the invention is the provision of a unique absorber arrangement capable of contributing to the development of fog or mist conditions for the absorbent fluid while collecting droplets of the remixed fluids for return to the boiler.

A still further object of the invention is the provision of a sequence including a predetermined pressure valve, jet, venturi and absorber capable of producing a vapor or fog condition and returning to the venturi, portions of the absorbent fluid for return to the absorber for further mixing.

Yet another object of the invention is the provision of a combination heating and cooling system wherein, for heating, the absorbent features are eliminated and the boiler, motor injector, and evaporator are employed through use of the refrigerant vapors to deliver heating at the evaporator.

Finally, a further object is the provision of such a combination system which is safe for use in vehicles and other installations because the refrigerant may comprise water and the absorbent bromide salts or the like.

Other objects and features of the invention will become more apparent to those skilled in the art from a reading of the following detailed description, when taken in the light of the accompanying drawings wherein.

Figure 1:
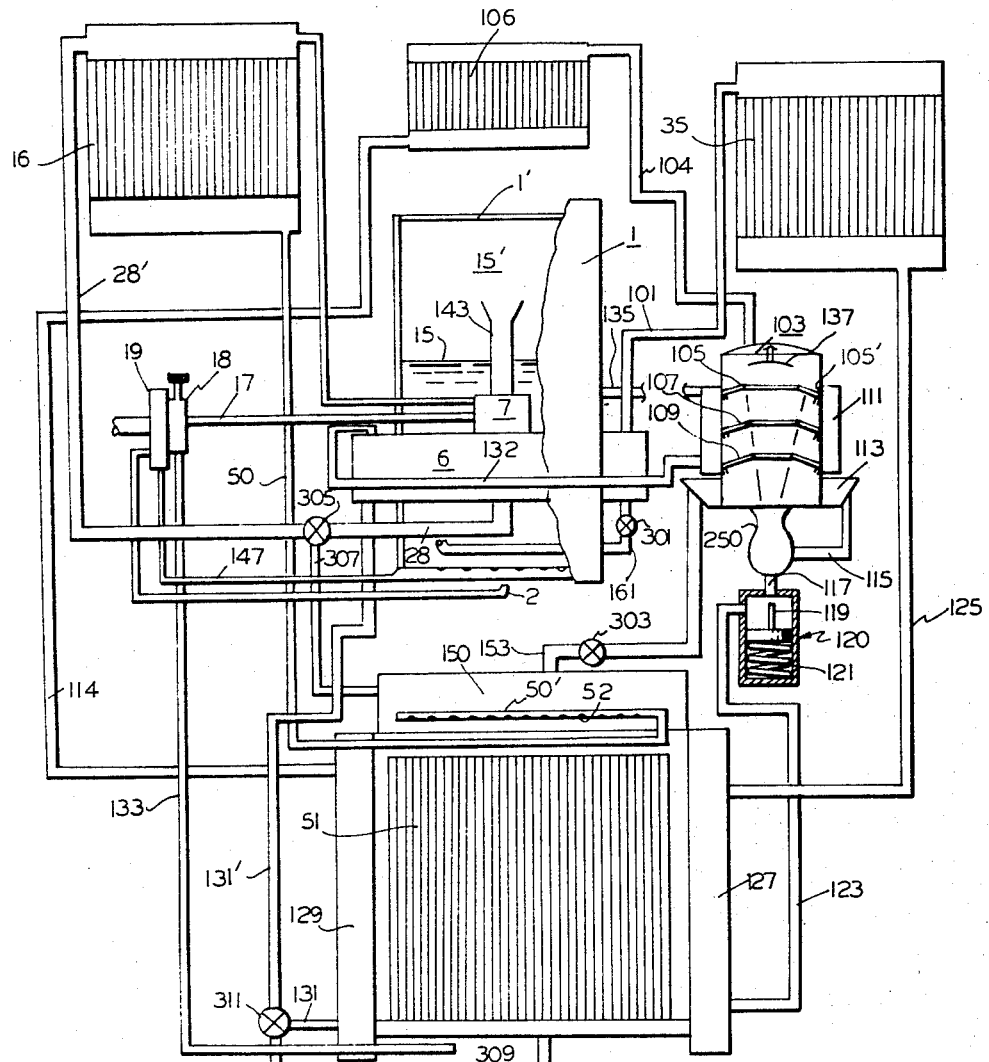
FIG. 1 is a schematic view, partly in section, of the components of the system of this invention in their interconnected and related arrangement.

The general overall system is depicted in FIGURE 1 wherein boiler 1' is shown with the heat shield 1 broken away to reveal sufficient of the contents of the interior thereof for understanding. It includes a control unit 7, comprising one type of suitable control for the motor injector unit 6, which is preferably located within the liquid of boiler 1', to minimize the crystallization and condensation problems heretofore encountered. The mixture of refrigerant and absorbent fluids in liquid form is indicated at 15, and the hot refrigerant vapor is shown at 15'. An outlet or escape tube 143, for the hot refrigerant vapor 15', extends from near the top of the boiler 1' to communicate with inlet conduits 8 (FIG. 2) of the control unit 7 for the motor injector 6.

The hot vaporized fluid 15', after giving up some energy to power motor injector 6, exits via conduits 28 and 28' to condenser 16 for condensing. From condenser 16, the refrigerant fluid follows conduit 50 to U-shaped metering tube 50' within evaporator 51 in space or compartment 150. This allows the flash of the spray by way of openings 52 to bathe the lower portion of the U-shaped tube to reduce the temperature of the incoming refrigerant. The preferred refrigerant fluid is water and it will normally be converted to steam or vapor in space 150 and throughout the evaporator 51.

The absorbent fluid is pumped off the lower end of boiler 1' from the mixture 15 by way of conduit 161 under power of motor injector 6 and forced through conduit 101 and through cooler 35. By way of example, the vapor pressure in boiler 1' may be of the order of 16 pounds per square inch whereas the pressure effective on the absorbent liquid beginning conduit 101 (through valve 120) may be of the order of 200 pounds per square inch. These figures are presented for a compact system wherein the motor portion employs pistons of approximately three inches in diameter and the injector employs pistons of approximately 1 inch in diameter.

From cooler 35, the absorbent liquid is forced through conduit 125 to a heat exchanger 127 and thence via conduit 123 to the predetermined pressure valve 120 including spring 121 and movable pin 119. Normally, this valve is closed to permit initial build up of pressure in the system and for the example given, it may be set to open at 190 pounds per square inch.

Next, the absorbent fluid, under this high pressure, passes through jet 117, in communication with venturi 250 which in turn exits into absorber 103. The steam or vapor from chamber 150 passes through conduit 153 to absorber 103 and the resultant mixed vapors are forwarded via tube 104 to condenser 106. From condenser 114 the liquids pass to heat exchanger 129. The passage back to the boiler includes conduits 131, 131', motor injector 6 and pipe 132 to heat exchanger 111 which cools the vapors in the absorber for better absorption and preheats the liquid returning to the boiler over pipe 135.

The principal features of the invention pertaining to the refrigeration function reside in the unique combination employing the motor injector 6 which will be explained, per se, with the description of FIGURE 2. However, it is now important to understand the operation of jet 117, venturi 250 and absorber 103, because it is these components which are effective under the high pressure delivered absorbent fluid to enable the efficient mixing action and also in combination with the closure or predetermined valve 120 to avoid the crystallization problem when an absorbent fluid, for example bromide salts, is used.

In FIGURE 1, the absorber 103 includes a series (only three are illustrated) of baffles or annular collector plates or rings 105, 107 and 109, which catch and deliver the unvaporized droplets to pan 113 and thence via pipe 115 to venturi 250 for reworking and further vaporizing.

Assuming the 200 pound per square inch absorbent fluid pressure passes jet 117, it creates a conical-type effect, with the openings of plates 109, 107 and 105, increasing in diameter to accommodate the conical spray or vapor and permit the latter to strike the diffusion plate 137 or opposite or top wall of absorber 103 for further vaporization. This resultant droplets, mist and fog provide optimum mixing with the steam or vapor passing in by way of conduit 153, pan 113 to absorber 103 to enable the highly efficient mixing action. Droplets fall onto the plates 105, 107 and 109 and exit through apertures adjacent the edges thereof, such as 105' within absorber 103 to return to pan collector 113. This structure in combination with the venturi 250 and the high pressure establishes a vortex or whirlpool type action which agitates the spray or vapor into the receptive condition. Portions of either of these fluids or mixture of same are collected by pan 113 and returned at 115 tot he venturi 250 for further direction into the absorber 103. Also it should be noted in passing that pin 119, under pressure of spring 121, maintains jet 117 clear of any impediments, when the valve is closed. It should be further pointed out at this time that when pin 119 closes jet 117 to maintain pressure on line 101, cooler 35, line 125, heat exchanger 127 and line 123, crystallization is precluded. This action also facilitates restarting of the system.

Figure 2:
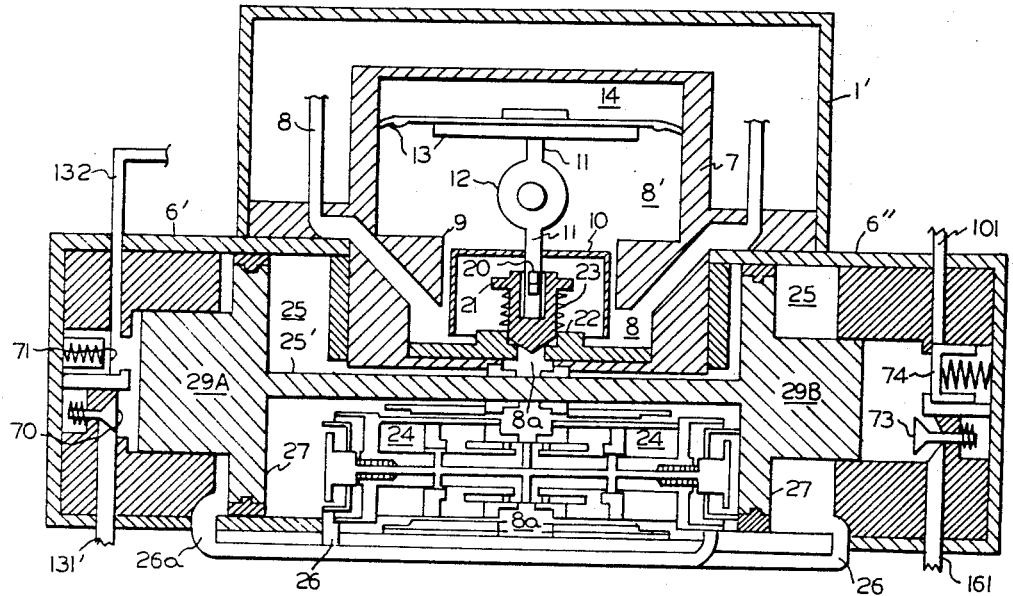
FIG. 2 shows the motor injector and control in cross section.

A modification, not illustrated, is the application of a volume increasing device, such as the motor injector, to be described in FIGURE 2 disposed in line 50 for the refrigerant fluid and operated in common with motor injector 6.

Otherwise, the boiler 1' may be heated and controlled in more or less conventional manner. For example, fuel valve 19 is responsive to control valve housing 7 under the direction of a rod enclosed by shaft 17 and temperature sensitive tube 133 which operates thermostat 18. The main gas supply for the burner is over line 147 and the pilot light is maintained at 2. These details will now be further explained with reference to FIGURES 2 and 3. Pilot light 2 is lighted causing boiler 1' and its contents to be heated to a condition whereby pressure is increased to a point necessary for the thermostatic control to become operative.

As the boiler 1' and its contents are heated by the main burner shown under the boiler, the refrigerant vapors rise from the absorbent liquids as at 15' (FIG. 1) and fill the entire inner spaces (FIG. 2), which are in communication with the vapor pickup tube 143 (FIG. 1). Then fuel valve 19 is responsive to the control valve housing 7 by virtue of rod 17 but wherein control valve housing 7, at diaphragm 13 forms a wall or a closure 14 in the upper portion thereof.

As pressure rises in the boiler, it also rises in passages 8 and cavities 8' and when it becomes great enough it causes upper movement of piston 10 to overcome the pressure of condenser 16 and cavity 14 is diminished and ball 12 of linkage 11 rises. A rod (not shown) within shaft 17 (FIG. 1) intersects the housing 7 and extends against the periphery of ball 12, being moved inwardly and outwardly because of point of contact. This rod of shaft 17 and thermostat 18 coact with the pistons of the rod being effective in opening the fuel supply valve, allowing fuel over the main burner supply 147, the burner of which is housed within the heat shield 1 to supply heat for the operation of the motor injector as long as the combined thermostat 18 and control head 7 call for heating. It should be pointed out that the main burner 147 may be replaced by any heat source such as the manifold or exhaust system of an automotive vehicle. Further control of the heating of the boiler is explained in great detail in my aforementioned Patent No. 2,699,153, but it is believed that the explanation contained herein is sufficient for the purposes of understanding this invention.

As pressure rises still higher in the boiler passages 8 and cavities 8', more fuel is supplied to the boiler, further raising diaphragm 13 and valve 21 (connected to shaft 11 and slip pin 20) to break the pressure seal in passage 22 and allow spring 23 to lift the valve higher. This allows free passage of the pressure of the boiler to be applied through passage 8a extending into the reversing valve mechanism generally designated at 24, the latter being the subject of my aforementioned Patent No. 3,236,441.

This reversing valve contains closures and passages suitable for controlling both the flow of pressure (from passages 8 and 8a) to either of cylinders 6″ and 6′. It will be noted that piston 29A is somewhat larger than piston 29B, as the amount of fluid to be pumped by piston 29A is greater than the amount of fluid to be pumped by piston 29B, and also it requires less pressure because piston 29B preferably should pump higher pressure than piston 29A.

In the position illustrated, valve 24 has completely supplied cylinder 6′ with pressure vapors by connecting passage 26 powering piston 29A on the inner side to the left and also powering piston 29B on the outer side to the left. Thus, the force of both pistons 29A and 29B is applied to the injector (left hand portion) of piston 29A moving piston 29A to the left. At the same time, reversing valve 24 was so positioned to exhaust through passage 28 (FIG. 1) extending to condenser 16 in the cooling mode. During the heating cycle exhaust is to the evaporator 51. Thus, there has been explained one movement of the pistons as accomplished by the reversing valve mechanism pressuring and exhausting the pistons. Succeeding cycles follow in like manner, each stroke in an opposite direction.

The absorbent fluid is pumped by the right hand end of motor injector 6 with the other end of piston 29B and the right end of cylinder 6″ being reduced to provide the piston-cylinder arrangement having inlet valve 73 and exhaust valve 74, serving the same purpose as valves 70 and 71 for piston 29A. The inlet opening end of boiler line 161 extends upward in boiler 1′ above the level of cylinder 6″ so the liquid level remains at least at this height. This allows the motor injector unit to be kept at about the same temperature as the heated liquids in the boiler to avoid undue condensation. As piston 29B moves to the left, the heated absorbent liquid is drawn in through inlet valve 73 to fill this displacement. The instant the piston stops, to reverse its movement from left to right, inlet valve 73 closes trapping the liquid in this displacement. As the piston 29B moves to the right, reducing the displacement, the cylinder 6″ forces exhaust valve 74 to open and the liquid is forwarded. As this liquid is forced under extreme pressure, it passes out of conduit 101 to cooler 35.

The opposite piston 29A works in similar manner with valves 70 and 71 to return the mixed liquids from conduit 131′ via conduit 132′ to the heat exchanger 111 and then to boiler 1′.

Figure 3:
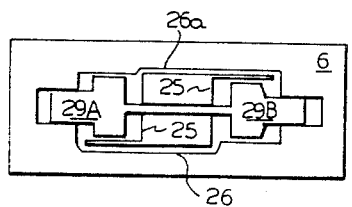
FIG. 3 is a schematic drawing showing the manner of powering both of the interconnected pistons for successive strokes in opposite directions.

FIG. 3 schematically explains the manner of moving both pistons in the same direction. Passages 26a from inner side of piston 29A to the outer side of piston 29B operates both pistons to the left and simultaneously passage 26 permits the inner side of piston 29B and the outer side of piston 29A to exhaust—all through the valving described.

When it is desired to convert the system to its heating mode, four two-way valves are operated to their opposite positions. The valves may be solenoid controlled or otherwise controlled valves in order that conversion may be effected by manipulation of a single switch or knob. Valve 301 in line 161 from the boiler for the absorbent fluid closes to prevent absorbent liquid from being drawn from the boiler 1′. Also valve 303 in lead 153 from the evaporator 51 to the absorber 103 closes to preclude refrigerant vapors from entering absorber 103.

Valve 305 in lead 28 from motor injector 6 closes passage 28′ to condenser 16 and opens alternate passage 307 to direct the refrigerant vapor from the boiler to chamber 150 of evaporator 51. The condensate from this refrigerant vapor is carried off from evaporator 51 over lead 309 to valve 311 which has now closed lead 131 and opened a connection from lead 309 to lead 131′. Thus the liquid refrigerant is pumped up through motor injector 6 to lead 132 where it merely passes through heat exchanger 111 and is returned to the boiler over lead 135.

It may therefore be appreciated that only a minimum number of components are required for the heating system and that a thermostat or other control may be employed to automatically switch from cooling to heating or vice versa, thus affording a climate control.

The system, of course, remains in condition to be switched back to cooling because the absorbent fluid pressure is maintained by predetermined pressure valve 120 and the other valves which closed off the absorbent features.

In the system described, the heat exchangers 127 and 129 are not necessary to all applications and may be by-passed.

Also, the system may be used for cooling only and the valves and alternate pipes are unnecessary to such use.

Other and further modifications will occur to those skilled in the art from a reading hereof and further, it is intended that the scope of the invention be limited only by the claims herein.

What is claimed is:

1. An absorption type refrigeration system having a boiler containing refrigerant and absorbent fluid wherein the refrigerant fluid passes through a condenser to an evaporator which includes a passageway to an absorber and wherein the absorbent fluid passes through a cooler to the absorber, the combination comprising: motor injector means in the refrigerant path before the condenser powered by the hot refrigerant vapors to power all fluids in the system; a jet passageway for the absorbent fluid from the cooler to the absorber; a venturi in communication between the jet passageway and the absorber; a further condenser; and a further passage from the absorber to the boiler including the further condenser whereby high pressure absorbent fluid is sprayed via the jet into the absorber for mixing with refrigerant fluid from the evaporator and the mixture returned to the boiler for reheating.

2. The system of claim 1 wherein the motor injector means is disposed in the boiler fluid.

3. The system of claim 1 further comprising a predetermined pressure valve operable by the absorbent fluid disposed between the cooler and the jet passageway.

4. The system of claim 3 wherein the motor injector means is characterized by supplying positive high pressure power to the absorbent fluid relative to the boiler pressure.

5. The system of claim 4 further comprising a metering tube for the refrigerant fluid between the condenser and the evaporator.

6. The system of claim 4 further comprising a heat exchanger in heat exchange relation with the evaporator for the absorbent fluid between the cooler and the valve.

7. The system of claim 1 wherein said absorber comprises a plurality of collectors having openings therethrough for the incoming absorbent fluid and a collecting compartment in communication with the collectors for droplets; said collecting compartment being in communication with said venturi.

8. The system of claim 7 further comprising another heat exchanger in heat transfer relation with the absorber for the mixed fluids being returned to the boiler.

9. The refrigeration system of claim 8 capable of a heating mode comprising in addition a first valve to close absorbent fluid flow from the boiler; a second valve to close refrigerant vapor to the absorber; a third valve and pipe means to direct hot refrigerant vapors from the motor injector to the evaporator for condensation; and a fourth valve and pipe means to direct the condensed refrigerant from the evaporator back to the boiler.

10. A combination heating and cooling system employing refrigerant and absorbent fluids comprising, in combination a boiler having a liquid level for heating the refrigerant and absorbent fluids to produce refrigerant vapors; a motor injector means for powering the fluids throughout the system, a conduit from the boiler to the motor injector means for the heated refrigerant vapors to power the motor injector means; a condenser; a conduit from the motor injector means for the refrigerant vapors passing therethrough to the condenser; an evaporator; a first valve in said conduit; a lead from the first valve to the evaporator; a lead from the condenser to the evaporator comprising a metering tube at its evaporator end; an absorber; a lead from the evaporator to the absorber for refrigerant vapors; a second valve in said last-mentioned lead to open and close the lead; a cooler; a lead from the boiler below its liquid level via one end of the motor injector to the cooler; a third valve in said last-mentioned lead; a predetermined pressure valve; a jet and venturi in communication between the predetermined pressure lead and the absorber; a lead from the cooler to the predetermined pressure valve for absorbent fluid; a second condenser; a lead from the absorber to the second condenser; a heat exchanger in heat exchange relation with the absorber; a lead from the second condenser by way of the other end of the motor injector to the heat exchanger in heat exchange relation with the absorber; and a lead from said heat exchanger back to the boiler.

11. The system of claim 11 further comprising another heat exchanger in heat exchange relation with the evaporator and interposed between the cooler and the predetermined pressure valve.

12. The system of claim 11 further comprising a further heat exchanger in heat exchange relation with the evaporator interposed in the lead between the second condenser and the heat exchanger associated with the absorber.

13. The system of claim 12 further comprising a valve in said last-mentioned lead and a further lead from the bottom of the evaporator to said valve.

14. The combination of claim 13 wherein the motor injector is disposed primarily in the liquid of the boiler.

15. The combination of claim 14 wherein the absorber comprises a plurality of annular collector rings and a plate disposed opposite the holes in said annular collector rings; and chamber means for feeding back to the venturi droplets collected by said rings.

References Cited

UNITED STATES PATENTS

| | | | |
|---|---|---|---|
| 2,929,222 | 3/1960 | Lang | 62—487 X |
| 2,930,204 | 3/1960 | Lang | 62—488 X |
| 3,015,221 | 1/1962 | Walker | 62—487 |
| 3,046,756 | 7/1962 | Whitlow et al. | 62—483 X |
| 3,266,266 | 8/1966 | Reid | 62—489 X |
| 3,293,881 | 12/1966 | Walker | 62—487 X |
| 3,320,760 | 5/1967 | Swearingen | 62—476 X |

LLOYD L. KING, *Primary Examiner.*

U.S. Cl. X.R.

62—476, 487, 489